W. C. SCHWAB.
COOKING UTENSIL.
APPLICATION FILED NOV. 26, 1917.
1,275,611. Patented Aug. 13, 1918.
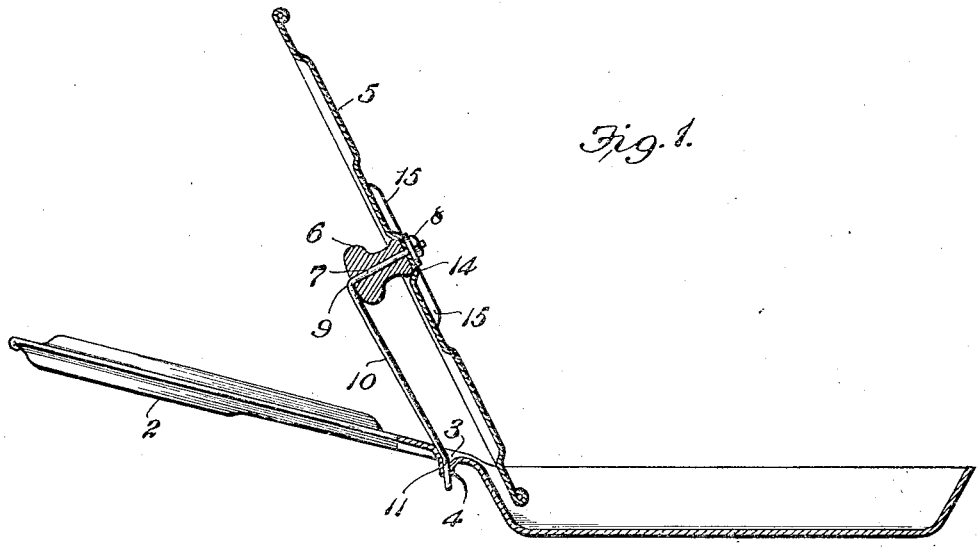
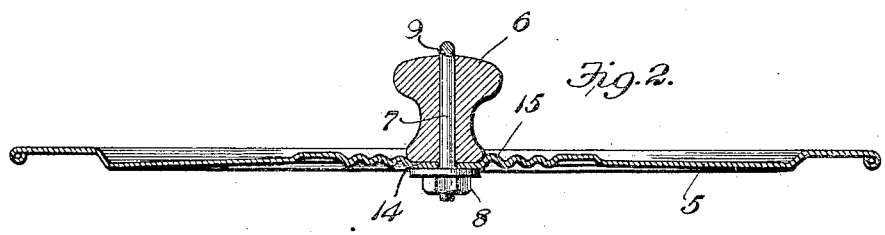
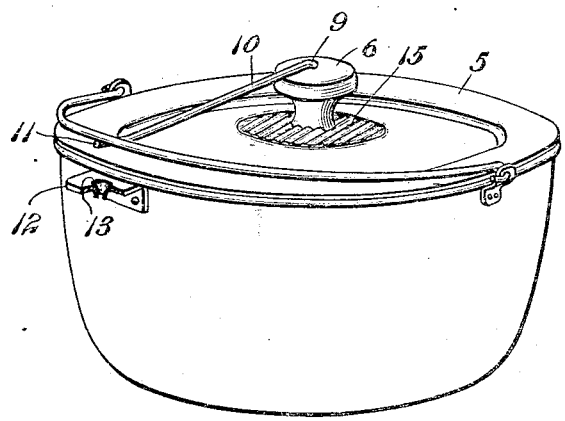
Inventor,
William C. Schwab,
J. W. Bond
Attorney

UNITED STATES PATENT OFFICE.

WILLIAM C. SCHWAB, OF CANTON, OHIO.

COOKING UTENSIL.

1,275,611.

Specification of Letters Patent. Patented Aug. 13, 1918.

Application filed November 26, 1917. Serial No. 203,894.

*To all whom it may concern:*

Be it known that I, WILLIAM C. SCHWAB, a citizen of the United States, residing at Canton, in the county of Stark and State of Ohio, have invented a new and useful Cooking Utensil, of which the following is a specification.

This invention relates to cooking utensils, the purpose being to construct a cooking utensil and the lid therefor in such a way that the lid can be conveniently supported in a substantially vertical position so that the grease and condensed steam accumulated on the lid drains back into the utensil when it is found necessary to remove the lid temporarily while the food in the utensil is in the process of cooking.

Another object is to support the lid in such a way that the hand of the cook which grasps the handle of the utensil will be protected from hot grease or other food which is liable to spatter out.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

In the drawings:

Figure 1 is a sectional view through a frying pan and the lid therefor constructed in accordance with my invention, the lid being shown in the supported position.

Fig. 2 is a cross sectional view of a lid forming part of my invention the section being taken at right angles to the line of the section of the lid in Fig. 1.

Fig. 3 is a perspective view of a kettle constructed in accordance with my invention.

Similar numerals of reference indicate corresponding parts throughout the several figures of the drawings.

It will be understood from the following explanation and description that cooking utensils of any size, shape or material can be constructed in accordance with my invention, but for the purpose of illustration it will only be necessary to show one or two types of utensils. The frying pan 1, in Fig. 1, has the ordinary handle 2 and adjacent the point where the handle joins the body of the pan, I form a conical depression 3 which terminates in a cylindrical collar 4 with an opening therethrough. The lid 5 has the usual knob 6 through which passes a retaining wire 7, which is threaded at one end to receive a nut 8 and is bent substantially at right angles as at 9 and extends in a line substantially parallel to the surface of the lid toward the periphery of the said lid as at 10. At a point near its outer extremity, the portion 10 is bent at a slight angle as at 11 for a purpose to be hereinafter set forth.

In adapting utensils such as the kettle shown in Fig. 3, to my invention an auxiliary handle 12 employed to tilt or hang up the kettles, carries the conical depression 13 which has a cylindrical collar and is precisely similar to the depression 3 and collar 4 previously referred to. The center portion of the lid, as clearly shown in Figs. 1 and 2 is stamped to form a perfectly flat surface 14 of the diameter of the knob to be used on the particular lid and surrounding the said knob and portion 14 are corrugations 15 which serve to add rigidity to the center portion of the lid.

We will now assume that a frying pan is being employed to cook steak or meat chops in which case a lid will be placed to cover the top of the utensil. Steam and grease resulting from the cooking process will accumulate upon the under side of the lid. The cook will, at intervals during the process of cooking, find it necessary to remove the lid for the purpose of turning the meat or inspecting it to ascertain how the cooking is progressing, in which case the steam and grease accumulated on its under side will drip off on to the floor or on the top of the stove. With the use of my device the cook lifts the lid and inserts the end 11 into the aperture 3 in the manner shown in Fig. 1. The lower edge of the lid is carried within the utensil and accumulated grease and steam will drain down the face of the lid and back into the said utensil. The cook may now grip the handle 2 without danger of having his hand burned by hot grease which frequently spatters out of the pan while the meat is being turned. Where a kettle or sauce pan such as shown in Fig. 3 is being employed for the purpose of cooking food, such for instance as mush, the lid must be removed from the utensil at intervals to stir the food and as is well known to those having had experience in cooking mush or the like, the heavy consistency of the food makes it necessary to hold the kettle with one hand while the mush is being stirred with the other. The auxiliary handle 12 forms a convenient place for the one hand of the cook to hold the utensil while the other is being employed to do the stirring, and since the lid when removed is supported by inserting the portion 11 into the aperture 13, the cook's hand is protected from steam or hot food which is liable to be spattered out of the utensil. It will also be seen that in Fig. 3 the bail used for lifting the kettle can be rested on the portion 11 during the cooking process, thereby preventing it from becoming too hot to be touched by the bare hand as would be the case were the bail to rest on top of the lid. When the lid is to be removed the bail can be thrown to the other side of the kettle. It will be seen from the foregoing that utensils made in accordance with my invention both serve to eliminate a great deal of the state of untidiness which results from cooking and also forms an efficient protection to the cook.

Having fully described my invention what I claim as new and desire to secure by Letters Patent, is—

1. In a cooking utensil, a lid adapted to cover the said utensil having a centrally located knob on its upper side, one end of a supporting member inserted through the said knob and the said lid, the said supporting member being secured upon the under side of the said lid and being bent substantially at right angles at the point where it emerges from the top of said knob, the said bent portion extending substantially parallel to the upper surface of the said lid to a point opposite the periphery thereof, an aperture formed in the handle of the said utensil at a point adjacent the body of the said utensil, the free end of the said supporting member being adapted to be inserted within the said aperture, the said free end of the said supporting member being bent near its free extremity to form a stop to limit the insertion of the said free end into the said aperture.

2. In a cooking utensil, a lid adapted to cover the said utensil having a centrally located knob upon its upper side, one end of a supporting rod inserted through an aperture in the said knob and the said lid, a nut secured upon the threaded inner end of the said supporting rod, the said rod being bent substantially at right angles at the point where it emerges from the said knob extending radially from the said knob toward the periphery of the said lid and terminating at a point substantially in a line with the periphery of the said lid and being bent slightly upward near its free end, a substantially horizontal portion extending from the side of the said utensil at a point adjacent its upper rim, a conical depression formed in the said horizontal portion, the said conical depression terminating in an elongated collar having an aperture therethrough adapted to receive the upturned end of the said supporting rod and the periphery of the said lid at the point opposite the said up-turned end of the said supporting rod being adapted to lie within the utensil when the said up-turned portion of the supporting rod is inserted in said aperture.

In testimony that I claim the above, I have hereunto subscribed my name.

WILLIAM C. SCHWAB.

Copies of this patent may be obtained for five cents each, by addressing the "Commissioner of Patents, Washington, D. C."